April 14, 1959   J. VERHOEFF   2,881,889
FRICTION CLUTCH
Filed Jan. 5, 1955

INVENTOR.
JACOB VERHOEFF
BY
AGENT

United States Patent Office 2,881,889
Patented Apr. 14, 1959

2,881,889
FRICTION CLUTCH

Jacob Verhoeff, Hilversum, Netherlands, assignor, by mesne assignments, to North American Philips Company, Inc., New York, N.Y., a corporation of Delaware Application January 5, 1955, Serial No. 479,943

Claims priority, application Netherlands February 23, 1954

2 Claims. (Cl. 192—79)

The invention relates to a friction clutch for connecting two rotating shafts arranged in line with one another; it is an object of the invention to provide a friction clutch which is inexpensive and easy to manufacture while the shafts need not be exactly in line with one another. It is well known to provide the two shafts required to be coupled with disc-shaped members, friction members being pressed against the circumferences of said disc-shaped members. In clutches of this kind, however, the shafts must be completely in line with one another. The clutch according to the invention, in which the two shafts are also provided with thin disc-shaped members, at least two separate friction members being provided each cooperating with the circumferences of both disc-shaped members, is characterized in that the friction members are shaped in the form of straight and preferably circular cylinders the axes of which lie in the same plane as the axes of the shafts required to be coupled and are interconnected by springs.

Figure 1:
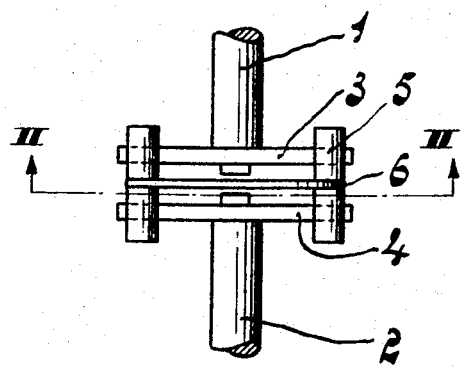
Figure 2:
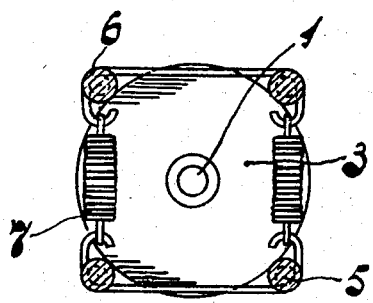

The invention will now be described more fully with reference to the accompanying drawing, in which Fig. 1 is a plan view of a clutch, and Fig. 2 is a cross-sectional view of the clutch shown in Fig. 1 taken along the line II—II and viewed in the direction of the arrows.

Referring now to the figures, two shafts required to be connected are designated 1 and 2. The shafts are both provided with a thin disc-shaped member 3 and 4 respectively. In addition, provision is made of four circular cylindrical members 5 which engage both the circumference of the disc 4 and that of the disc 3 and each have a groove 6 located approximately between the ends thereof. In these grooves 6 a metal wire is arranged which wires are interconnected by springs 7. Since the springs press the members 5 against the circumferences of the discs 3 and 4, the shaft 2 will be driven on rotation of the shaft 1. It was found that the shafts 1 and 2 need not be exactly aligned, they may be at a slight angle with respect to each other without interfering with the operation of the clutch. The clutch is satisfactory in practice and as simple as possible. Mounting and dismounting will not present difficulty.

What is claimed is:

1. A friction clutch for connecting two rotatable shafts substantially co-axially aligned with one another comprising a pair of thin disc-shaped members having similar diametric dimensions and having surfaces defined by the circumferences thereof, means for mounting said disc-shaped members on corresponding shafts, at least two cylindrically-shaped friction members mounted on the circumferential surfaces of said disc-shaped members for coupling the disc-shaped members to one another, and yieldable members between said friction members for interconnecting the latter.

2. A friction clutch for connecting two rotatable shafts substantially co-axially aligned with one another comprising a pair of thin disc-shaped members having the same diametric dimensions and having surfaces defined by the circumferences thereof, means for mounting said disc-shaped members on corresponding shafts, at least two cylindrically-shaped friction members mounted on the circumferential surfaces of said disc-shaped members for coupling the disc-shaped members to one another, the axes of said friction members being substantially parallel with the axes of said shafts, and spring members between said friction members for yieldably interconnecting the latter.

References Cited in the file of this patent
UNITED STATES PATENTS

| | | |
|---|---|---|
| 987,878 | Hornby | Mar. 28, 1911 |
| 1,847,882 | Lorig | Mar. 1, 1932 |